United States Patent

Gach

[19]

[11] Patent Number: 5,937,941
[45] Date of Patent: Aug. 17, 1999

[54] HEATING, VENTILATING AND/OR AIR CONDITIONING INSTALLATION WITH FUZZY LOGIC REGULATION, ESPECIALLY FOR A MOTOR VEHICLE

[75] Inventor: Béatrice Gach, Voisins le Bretonneux, France

[73] Assignee: Valeo Climatisation, La Verriere, France

[21] Appl. No.: 08/959,210

[22] Filed: Oct. 28, 1997

[30] Foreign Application Priority Data

Oct. 28, 1996 [FR] France .................................. 96 13136

[51] Int. Cl.$^6$ .................................................. F25B 29/00
[52] U.S. Cl. .......................... 165/204; 165/202; 165/42; 165/43; 165/247; 236/49.3; 236/91 C; 236/78 D; 395/61; 706/52; 706/900
[58] Field of Search ................................. 165/201, 202, 165/204, 42, 43, 247; 236/49.3, 91 C, 78 D; 395/61; 706/52, 900

[56] References Cited

U.S. PATENT DOCUMENTS

| | | | |
|---|---|---|---|
| 4,914,924 | 4/1990 | Takahashi | 165/43 |
| 5,165,595 | 11/1992 | Horio et al. | 236/49.3 |
| 5,427,313 | 6/1995 | Davis, Jr. et al. | 165/42 |
| 5,450,999 | 9/1995 | Scholten et al. | 236/78 D |
| 5,516,041 | 5/1996 | Davis, Jr. et al. | 165/43 |
| 5,549,152 | 8/1996 | Davis, Jr. et al. | 165/43 |
| 5,553,776 | 9/1996 | Davis, Jr. et al. | 236/49.3 |
| 5,568,733 | 10/1996 | Toyota et al. | 236/78 D |
| 5,570,838 | 11/1996 | Davis, Jr. et al. | 236/49.3 |
| 5,579,994 | 12/1996 | Davis, Jr. et al. | 236/91 C |
| 5,613,369 | 3/1997 | Sato et al. | 236/78 D |
| 5,755,378 | 5/1998 | Dage et al. | 236/91 C |

FOREIGN PATENT DOCUMENTS

95/01592  1/1995  WIPO .

OTHER PUBLICATIONS

Patent Abstract of Japan–JP 06 171352 A (Zexel Corp), Jun. 21, 1994.
French Search Report dated Jul. 4, 1997.

*Primary Examiner*—John K. Ford
*Attorney, Agent, or Firm*—Morgan & Finnegan, L.L.P.

[57] ABSTRACT

An air conditioning installation for the cabin of a motor vehicle comprises an air treatment and distribution unit, consisting of a trunk containing distribution valves and a mixing valve, together with a heater. The installation treats fresh air, drawn from outside and/or recirculated air and delivered by a blower, and distributes the treated air into the cabin of the vehicle. The installation includes sensors for periodic measurement of the temperature inside the cabin, the outside temperature and the temperature of the engine coolant fluid. It also includes a setting module whereby the demand temperature in the cabin can be set by the user, and control means for measuring a difference between the demand temperature and the prevailing inside temperature. The control means include a regulating module for defining required adjustments for the various components of the air treatment and distribution unit and for the blower, these adjustments being derived from the difference mentioned above, the outside temperature, and at least three fuzzy logic rules which are stored in a memory.

14 Claims, 6 Drawing Sheets

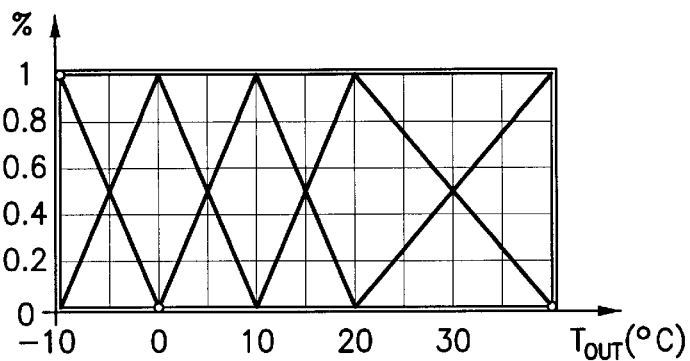
FIG.3A
FIG.3B
| $T_{OUT}$ | VERY COLD WEATHER | COLD WEATHER | TEMPERATE WEATHER | HOT WEATHER | VERY HOT WEATHER |
|---|---|---|---|---|---|
| MIX | 80% OPEN | 70% OPEN | 50% OPEN | 35% OPEN | 0% OPEN |
FIG.3C
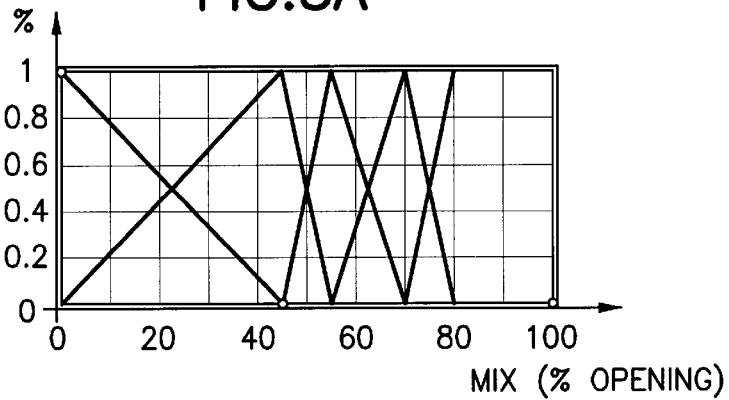
| $T_{OUT}$ | VERY COLD WEATHER | COLD WEATHER | TEMPERATE WEATHER | HOT WEATHER | VERY HOT WEATHER |
|---|---|---|---|---|---|
| AIV | RECYCLED AIR | FRESH AIR | FRESH AIR | FRESH AIR | RECYCLED AIR |
FIG.4

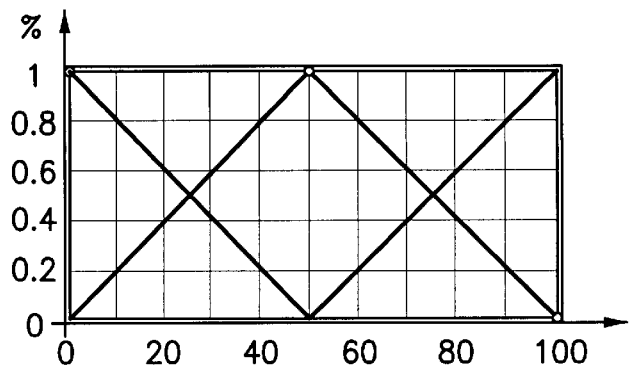
FIG.5A
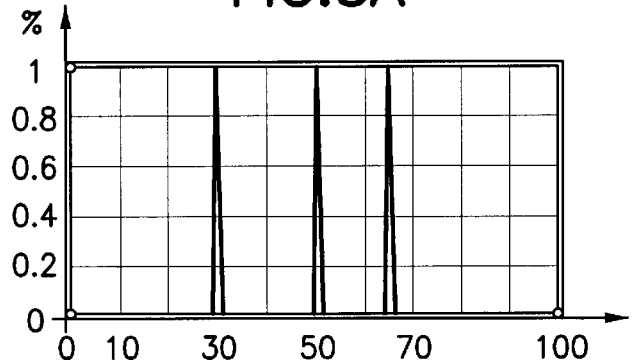
FIG.5B
| $T_{OUT}$ \ MIX | COLD | MODERATE | HOT |
|---|---|---|---|
| VERY COLD WEATHER | OPEN 100D | OPEN 65PD | OPEN 65PD |
| COLD WEATHER | OPEN 100D | OPEN 65PD | OPEN 65PD |
| TEMPERATE WEATHER | OPEN 65PD | OPEN 50 PDA | OPEN 50PDA |
| HOT WEATHER | OPEN 30PDA | OPEN 30PDA | OPEN 65PD |
| VERY HOT WEATHER | OPEN 0A | OPEN 0A | OPEN 65PD |
FIG.5C
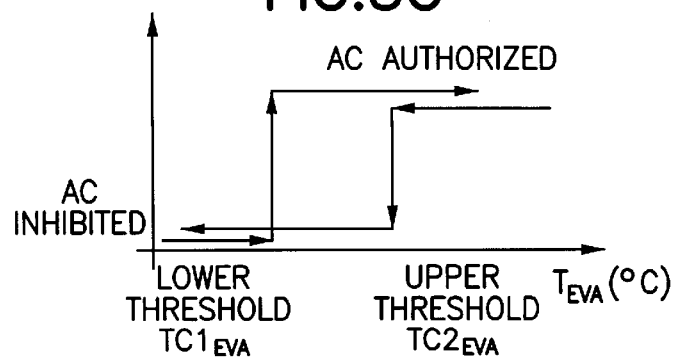
FIG.6

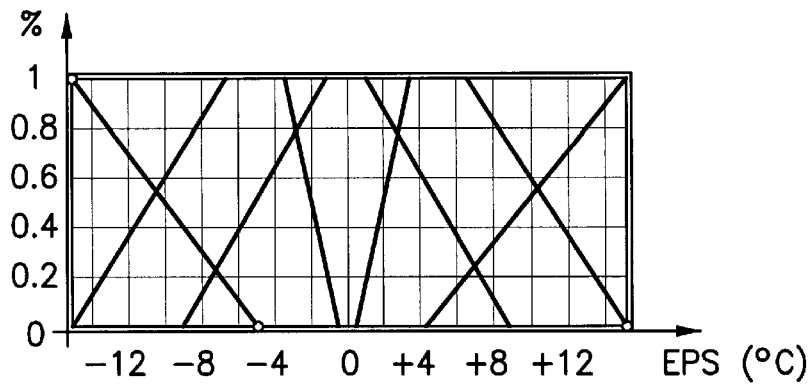
FIG.7A
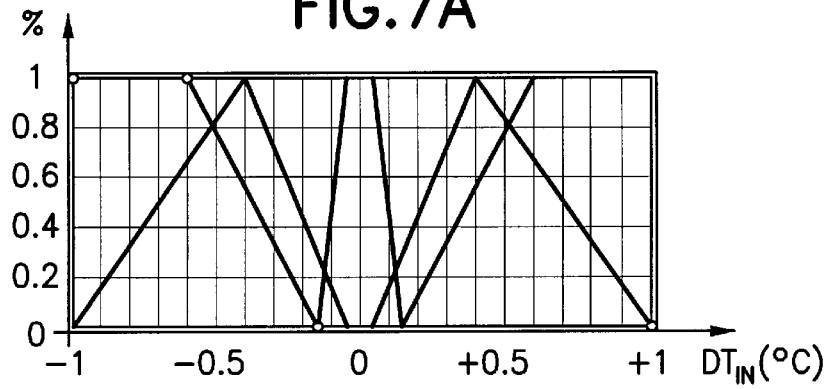
FIG.7B
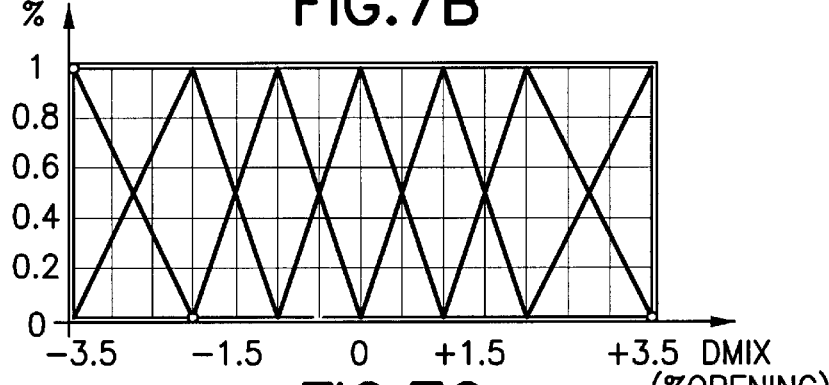
FIG.7C
| EPS \ DT$_{IN}$ | TP RISING GREATLY | TP RISING | TP STABLE | TP FALLING | TP FALLING GREATLY |
|---|---|---|---|---|---|
| TN (VERY NEGATIVE) | TTN | TTN | TTN | TN | N |
| N (NEGATIVE) | TTN | TN | N | Z | Z |
| Z (ZERO) | TN | Z | Z | TP | TTP |
| P (POSITIVE) | Z | Z | P | TP | TTP |
| TP (VERY POSITIVE) | P | TP | TTP | TTP | TTP |
FIG.7D

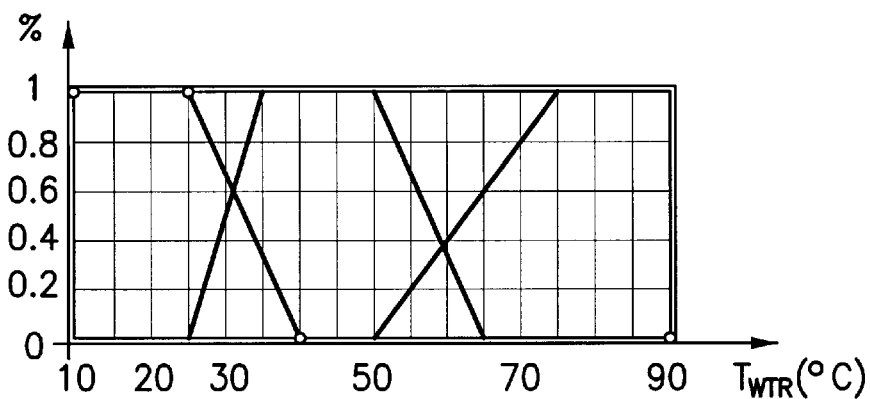
FIG.8A
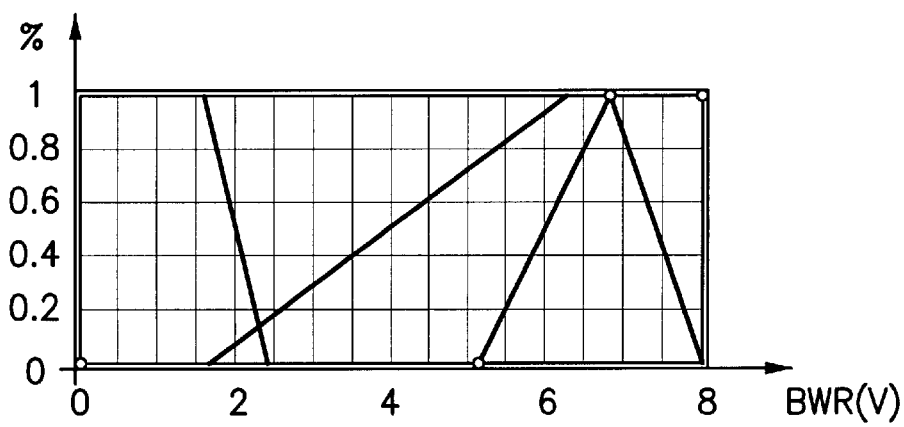
FIG.8B
| EPS \ T_WTR | COLD | MODERATE | HOT |
|---|---|---|---|
| TN | MINI | HIGH | HIGH |
| N | MINI | MIDDLE | MIDDLE |
| Z | MINI | MINI | MINI |
| P | MINI | MIDDLE | MINI |
| TP | HIGH | MINI | MIDDLE |
FIG.8C

| $T_{OUT}$ \ EPS | TN | N | Z | P | TP |
|---|---|---|---|---|---|
| VERY COLD WEATHER | RECYCLED AIR | RECYCLED AIR | RECYCLED AIR | RECYCLED AIR | RECYCLED AIR |
| COLD WEATHER | FRESH AIR | FRESH AIR | FRESH AIR | FRESH AIR | FRESH AIR |
| TEMPERATE WEATHER | FRESH AIR | FRESH AIR | FRESH AIR | FRESH AIR | FRESH AIR |
| HOT WEATHER | FRESH AIR | FRESH AIR | FRESH AIR | FRESH AIR | FRESH AIR |
| VERY HOT WEATHER | RECYCLED AIR | RECYCLED AIR | RECYCLED AIR | RECYCLED AIR | RECYCLED AIR |

FIG.9

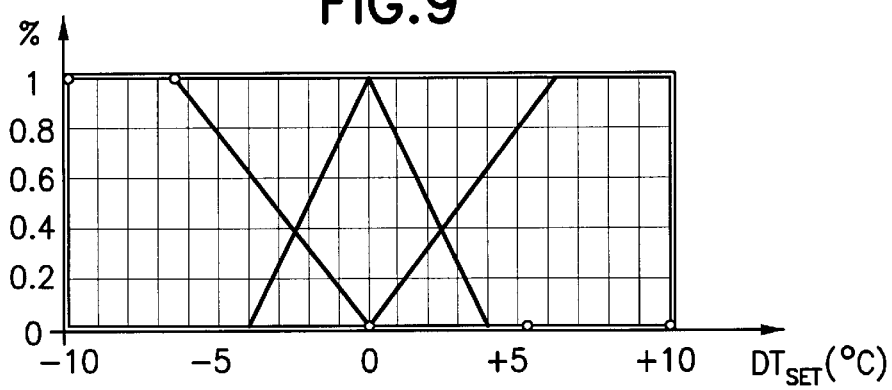

| $DT_{SET}$ | NEGATIVE | ZERO | POSITIVE |
|---|---|---|---|
| D2 MIX | CLOSE VALVE | DON'T MOVE | OPEN VALVE |

FIG.10C

HEATING, VENTILATING AND/OR AIR CONDITIONING INSTALLATION WITH FUZZY LOGIC REGULATION, ESPECIALLY FOR A MOTOR VEHICLE

FIELD OF THE INVENTION

This invention relates to installations for the purpose of heating, ventilating and/or air conditioning, especially (though without limitation) for the cabin of a motor vehicle, the installation being more particularly an installation which is regulated using fuzzy logic.

More precisely, the invention is concerned with an installation for heating, ventilating and/or air conditioning which includes at least the following elements:

- a first sensor for measuring periodically the temperature in a space to be supplied with air treated by the installation, this temperature being referred to as the inside temperature, and the said space being for example, but without limitation, a cabin of a motor vehicle;
- a second sensor for periodically measuring the temperature outside the said space, referred to herein as the outside temperature;
- a setting module for enabling a user to set required, or demand, values of parameters for adjustment of atmospheric conditions within the said space, the said parameters including at least the inside temperature;
- an air treatment and distribution unit comprising a casing containing a mixing valve and a heating radiator for treating fresh air drawn from outside, and/or air recirculated from the said space, together with distribution valves for distributing the air treated by the installation into the said space;
- a blower for supplying the said air treatment and distribution unit with fresh air and/or recirculated air; and
- control means capable of measuring a first difference, this first difference being defined as the difference between the demand temperature, i.e. the required value of the inside temperature as set by the user, and the prevailing inside temperature, the said control means including a first memory for storing the prevailing values of the said inside and outside temperatures and the demand temperature, and a regulating module for defining adjustments for at least the components of the installation contained in the air treatment and distribution unit, and adjustments for the blower, by derivation of the said adjustments from the said first difference and outside temperature. Such an installation will be referred to in this description as an installation of the kind specified.

In this Application, the above mentioned space to be supplied with treated air will for convenience be referred to simply as the cabin, it being understood that the space does not necessarily consist of a cabin of a vehicle.

BACKGROUND OF THE INVENTION

Certain installations of the above kind, such as that described for example in U.S. Pat. No. 5,165,595, contain in a second memory operating laws or rules of the so-called "fuzzy" type, which enable the position of the distribution valves and mixing valve, and adjustment of the blower, to be managed on the basis of knowledge of the measured values of the inside temperature and outside temperature, the demand temperature, and a measured degree of exposure to the sun.

Because these installations have a large number of sensors, they are very complicated, and make it necessary to provide a large number of fuzzy rules, memorisation of which requires the use of high capacity memories: this in turn increases the cost of the installation. In addition, these fuzzy rules are generally dependent on each other, and this greatly reduces the speed with which the adjustments required for the various components of the installation by the control means can be defined. The rate at which the inside temperature converges towards the demand temperature is therefore also reduced, and this is detrimental to the comfort of the occupants of the cabin.

In addition, the fuzzy rules used in these prior art installations do not enable rapid decisions to be made when there is a sudden sharp change in the demand temperature or in the inside temperature.

DISCUSSION OF THE INVENTION

An object of the invention is to provide a heating, ventilating and/or air conditioning installation which reduces or eliminates the above mentioned drawbacks.

According to the invention, an installation of the kind specified is characterised in that:

- it includes a third sensor for measuring the temperature of a liquid (for example the temperature of a coolant liquid for the engine of a vehicle that includes the said installation), this temperature being referred to herein for convenience as the water temperature;
- the control means include a second memory for storing a first table of fuzzy rules, a second table of fuzzy rules and a third table of fuzzy rules, the first table establishing correspondence between ranges of the outside temperature and positions of the mixing valve, the second table establishing correspondence between, on the one hand, pairs of values consisting of ranges of the outside temperature and ranges of the mixing valve position, and, on the other hand, positions of the distribution valves, and the third table establishing correspondence between, on the one hand, pairs of values consisting of ranges of the water temperature and ranges of the said first difference, and, on the other hand, adjustments of the blower; and
- the regulating module is arranged to define at least: the required position of the mixing valve derived from a comparison between the said first table and the prevailing outside temperature; the required positions for the distribution valves, derived from a comparison between the said second table and the pair of values consisting of the prevailing values of the outside temperature and the said required position of the mixing valve which has just been defined; and the required adjustment for the blower, derived from a comparison between the said third table and the prevailing water temperature.

With this arrangement there is no need to provide a sunlight sensor, and this simplifies the installation and enables a very substantial reduction to be made in the number of fuzzy rules which are required in order to define the various required adjustments. Consequently, the capacity of the memories can be substantially reduced.

According to a preferred feature of the invention, the control module is adapted to measure a second difference, the said second difference being the difference between a previous value of the inside temperature stored in the first memory and the prevailing value of the inside temperature, that is to say the last measured value of the inside temperature, the second memory being further arranged to store a fourth table of fuzzy rules establishing correspondence between pairs of values of ranges of the said first difference and ranges of the said second difference, on the one hand, and variations in the position of the mixing valve on the other.

In an installation having this feature, the regulating module is able to optimise the position of the mixing valve by performing a comparison between the fourth table and the pair of values consisting of the first and second differences then prevailing, as determined by the regulating, or computing, module.

Thus, in the event that the temperature in the cabin changes, it is possible, between two successive measurements taken by the sensors, to perform an adjustment (or optimisation) of the position of the mixing valve, rather than completely redefining the various adjustments required for the entire installation.

The regulating module is also able to optimise (or adjust) the positions of the distribution valves, by making a comparison between the said third table and the optimised position of the mixing valve.

According to another preferred feature of the invention, where the installation is equipped with an air inlet valve for supplying fresh air and/or recirculated air to the blower, the second memory is adapted to contain a fifth table of fuzzy rules establishing correspondence between pairs of values consisting of ranges of the said first difference and ranges of the outside temperature, on the one hand, and positions of the air inlet valve on the other. With this arrangement, the regulating module is also able to define, in fuzzy logic, the required position for the air inlet valve by derivation from a comparison between the said fifth table and the pair of values consisting of the prevailing value of the said first difference and the prevailing value of the outside temperature.

When in automatic mode, the installation is then entirely governed by fuzzy logic rules, and this greatly simplifes the design of its control means.

In addition, where the installation includes a refrigerating or cold loop, and therefore has an evaporator (which is typically housed in the air treatment and distribution unit) and a compressor, the evaporator and compressor being supplied with a coolant fluid, then, according to a further preferred feature of the invention, a fourth sensor is provided for measuring the prevailing temperature of the evaporator. In this way, the regulating module is able to make a decision as to starting the compressor, as a function of a first comparison between the prevailing evaporator temperature and two threshold values of temperature, namely a first and a second threshold value. This enables the temperature at the surface of the evaporator to be monitored in such a way that any water on the walls of the evaporator can be prevented from icing up.

In that case, it is of particular advantage to store in the second memory a sixth table of fuzzy rules establishing correspondence between, on the one hand, pairs of values consisting of ranges of the first difference and ranges of the water temperature, and required adjustments for the compressor on the other hand, such that the regulating module is able to define the adjustment required for the compressor after authorisation has been given for the compressor to start, this definition of the required compressor adjustment being derived from the comparison between the said sixth table and the pair of values consisting of the prevailing value of the first difference and the prevailing value of the water temperature. It is thus possible to define the required adjustment for the compressor by fuzzy logic, including the case where the compressor is of a variable capacity type.

According to yet another preferred feature of the invention, the regulating module includes an initial adjustment module for defining the adjustments for the various adjustable components of the installation each time the installation is started up, these definitions being derived from, at least, the prevailing value of the outside temperature. This enables the various adjustments of the components to be defined in a simplified way, and this in turn increases even more the rate at which the inside temperature is brought to the required, or demand, temperature.

Preferably, the initial adjustment module is so designed that, firstly, it defines the initial position of the mixing valve from a comparison between the said first table and the prevailing outside temperature, then defines the initial positions of the distribution valves from a comparison between the said third table and the pair of values consisting of the prevailing outside temperature and the initial position of the mixing valve that has just been defined, and, secondly, it sets the initial adjustment of the blower at a predetermined threshold value.

The initial position of the air inlet valve can also be defined. To this end, in preferred embodiments of the invention, a seventh table of fuzzy rules is stored in the second memory, this seventh table establishing correspondence between ranges of the outside temperature and positions of the air inlet valve, in order that the initial adjustment module can perform a comparison between the said seventh table and the prevailing outside temperature, whereby to define the initial position of the air inlet valve.

Where the installation includes an air conditioning function, the initial adjustment module is also preferably adapted to set the initial adjustment of the compressor at a predetermined threshold value.

According to a still further preferred feature of the invention, the second memory contains an eighth table of fuzzy rules establishing correspondence between ranges of demand temperature and modified demand temperature, on the one hand, and modified positions of the mixing valve, whereby to enable the regulating module, in the event that the user changes the setting of demand temperature, to modify the prevailing position of the mixing valve without it being necessary to redefine all of the adjustments required in the installation. To this end, the regulating module carries out a comparison between the said eighth table and the change of demand temperature, and from this it deduces the required change in the position of the mixing valve. Thus, when the demand temperature is changed by the user, this feature enables the inside temperature to be adjusted more quickly to its required new value.

Preferably, the decision to modify the position of the mixing valve, resulting from a modification of the demand temperature, may be accompanied by a comparison between a threshold value and the sum of the modified position of the mixing valve and the change in the position of the mixing valve. This avoids any radical modification of the prevailing adjustments of the components of the installation when the change in demand temperature is only minimal.

According to a further preferred feature of the invention, before any new adjustment of the blower is established, the regulating module performs a comparison between this proposed new amount of the adjustment of the blower and the preceding adjustment of the blower which is stored in the memory, and then decides whether to adjust the blower by this new amount, or by a reduced amount at a mean level between the proposed new amount and the amount of the preceding adjustment, according to whether these latter are very different, or only slightly different, respectively, from each other. This avoids unduly sharp variations in the air flow rate supplied by the blower, and therefore reduces or eliminates the undesirable noise that generally accompanies such sharp changes.

Further features and advantages of the invention will appear more clearly on a reading of the following detailed description of a preferred embodiment of the invention, which is given by way of non-limiting example only and with reference to the accompanying drawings.

BRIEF DESCRIPTION OF THE DRAWINGS

FIGS. 3A and 3B are weighting diagrams illustrating fuzzy logic distributions of an input variable (outside temperature) and an output variable (position of the mixing valve), respectively.

FIG. 3C is a first table of "fuzzy" rules establishing correspondence between ranges of outside temperature and positions of the mixing valve.

FIG. 4 is a second table of "fuzzy" rules, establishing correspondence between ranges of outside temperature and positions of the air inlet valve.

FIGS. 5A and 5B are weighting diagrams illustrating fuzzy logic distributions in another input variable (the position of the mixing valve) and another output variable (the position of the distribution valves).

FIG. 5C is a third table of "fuzzy" rules establishing correspondence between pairs of values consisting of ranges of outside temperature and ranges of mixing valve position, and positions of the distribution valves.

FIG. 6 is a diagram illustrating one method of operation for conditioned air as a function of the temperature of the evaporator.

FIGS. 7A to 7C are weighting diagrams illustrating fuzzy logic distributions for, respectively, a further input variable (a first difference between the measured inside temperature and the demand temperature, and a second difference between two successive measurements of inside temperature) and a further output variable (the variation in the position of the mixing valve).

FIG. 7D is a fourth table of "fuzzy" rules establishing correspondence between pairs of values consisting of ranges of the first difference and ranges of the second difference defined above with reference to FIGS. 7A to 7C, and variations in the position of the mixing valve.

FIGS. 8A and 8B are weighting diagrams illustrating fuzzy logic distributions for yet another input variable (engine water temperature) and yet another output variable (adjustment of the blower), respectively.

FIG. 8C is a fifth table of "fuzzy" rules establishing correspondence between pairs of values consisting of ranges of the first difference mentioned above and ranges of water temperature, and adjustments of the blower.

FIG. 9 is a sixth table of "fuzzy" rules for air inlet valve 17.

FIGS. 10A and 10B are weighting diagrams illustrating fuzzy logic distributions for a further input variable (variation in temperature setting) and a further output variable (variation in the position of the mixing valve), respectively.

FIG. 10C is a seventh table of "fuzzy" rules establishing correspondence between ranges of variation in temperature setting and ranges of variation in the mixing valve position.

DESCRIPTION OF A PREFERRED EMBODIMENT OF THE INVENTION

Figure 1:
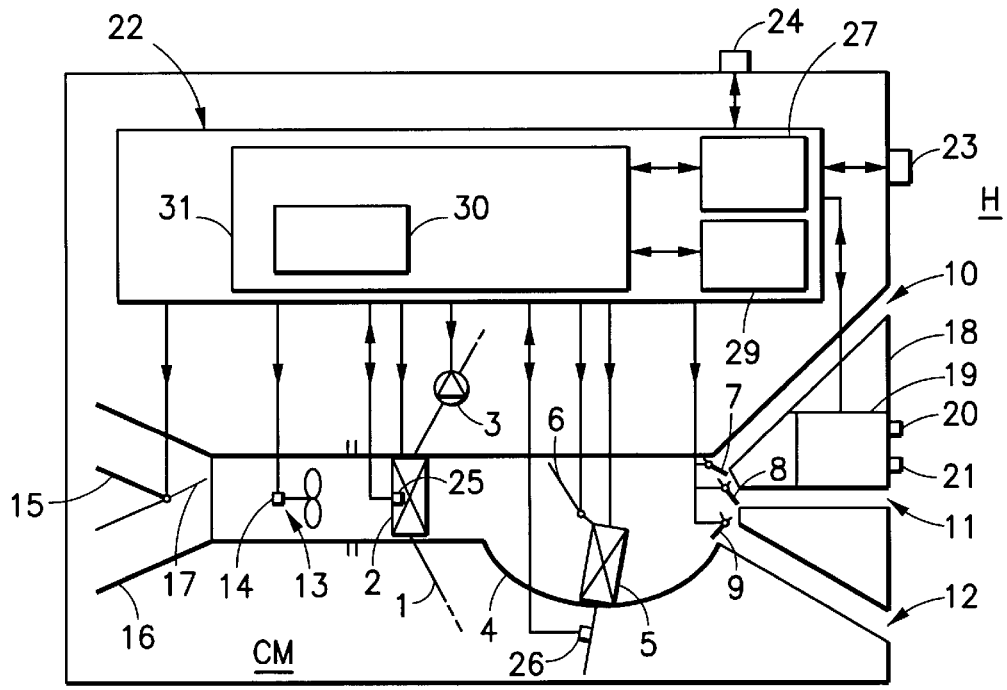
FIG. 1 is a diagram illustrating an air conditioning installation with fuzzy logic regulation in accordance with the invention.

Reference is first made to FIG. 1, which shows the main components of an installation for heating, ventilating and air conditioning with regulation by fuzzy logic. It will of course be understood that the description is not limited only to this type of installation. In more general terms, it concerns any type of installation for heating and/or ventilation and/or air conditioning, especially, but not only, for motor vehicles.

Very generally, an air conditioning installation comprises a cold loop 1 (partly shown in FIG. 1) for cooling air that is to be delivered into the cabin H of the vehicle, together with a hot loop for heating air that is to be delivered to the cabin H.

The cold loop 1 includes, in particular, an evaporator for converting into cold gas a refrigerant fluid which passes through it in the form of cold liquid or gas or both, together with a compressor 3 which receives the cold gas produced by the evaporator 2 and compresses it into the form of a hot gas. This compressor may be of a variable capacity type; however, in the remainder of this description the compressor will be taken to operate in a go/no go mode.

The hot loop is contained generally within an air treatment and distribution trunk or unit 4. The unit 4 includes, in particular, a heating radiator 5 in which there flows a fluid, such as water used for cooling the engine of the vehicle, a mixing valve 6, and a set of distribution valves 7 to 9. The mixing valve 6 controls the temperature of treated air to be distributed into the cabin H. The distribution valves 7 to 9 are located downstream of the heating radiator 5 and downstream of the mixing valve 6.

In the example shown in FIG. 1, a first distribution valve 7 determines the mass flow of processed air which is to be supplied to a de-icing port 10 located substantially at the base of the windshield of the vehicle. A second distribution valve 8 determines the mass flow of processed air to be supplied to a central ventilating port 11 located in the fascia of the vehicle, while a third distribution valve 9 determines the mass flow of processed air which is to be supplied to a lower ventilating duct 12 located in the lower part of the cabin, substantially on a level with the feet of the occupants of the vehicle.

The evaporator 2 of the cold loop 1 is also contained in the trunk 4, upstream of the heating radiator 5 and mixing valve 6.

The trunk 4 is supplied with air to be treated by a motorised blower unit 13 which includes a blower 14 driven by a variable speed electric motor. The motorised blower unit 13 is connected to two ducts 15 and 16 which are shown in part in FIG. 1. The first of these ducts, 15, leads from the cabin of the vehicle so as to enable air which it contains to be re-treated by the air conditioning installation. The second duct 16 is open on the outside of the vehicle, so as to supply fresh air to the installation for treatment. The outputs of the two inlet ducts 15 and 16 are controlled by an air inlet valve 17, to which further reference will be made later on in this description.

In order to enable a user, such as the driver or a passenger, located in the cabin H of the vehicle, to set the required (or "demand") values of atmospheric parameters for the cabin, a setting module 19 is provided in the fascia 18 of the vehicle. The setting module 19 has on its front a number of buttons 20 and 21 which need not be described here. The setting module 19 is connected to a control module 22, the purpose of which is to define the adjustments for the various components of the cold and hot loops of the installation, in response to the demand values as set by the user.

The control module 22 may be in the form of a microprocessor, the outputs of which are connected, respectively, to the air inlet valve 17, 15 the electric motor of the blower 14, the evaporator 2, the compressor 3, the heating radiator 5, the mixing valve 6, and the distribution valves 7 to 9.

Regulation of the inside temperature, that is to say the temperature within the cabin H, is obtained from knowledge of the actual temperature in the cabin, i.e. the inside temperature $T_{in}$ and the temperature outside the cabin, which is the outside temperature $T_{out}$. These two temperatures are measured periodically by a first temperature sensor 23, measuring the inside temperature, and a second temperature sensor 24 measuring the outside temperature. The sensors 23 and 24 are connected to respective inputs of the control module 22.

Inputs of the control module 22 are also connected to the setting module 19, which transmits to them, in particular, the temperature setting $T_{set}$, i.e. the demand value of inside temperature which is set by an occupant of the vehicle using appropriate setting buttons 20, 21, this corresponding to the temperature which it is desired to obtain in the cabin H.

In addition, in the example shown, the installation includes a third temperature sensor 25 and a fourth temperature sensor 26. The purpose of the third temperature sensor 25 is to measure the temperature $T_{eva}$ at the surface of the evaporator 2, while the sensor 26 measures the water temperature $T_{wtr}$, which is the temperature of the engine coolant fluid flowing in the heating radiator 5. The third sensor 25 and the fourth sensor 26 are also connected to appropriate inputs of the control module 22, which is again arranged to receive the signals from these sensors periodically.

Figure 2:
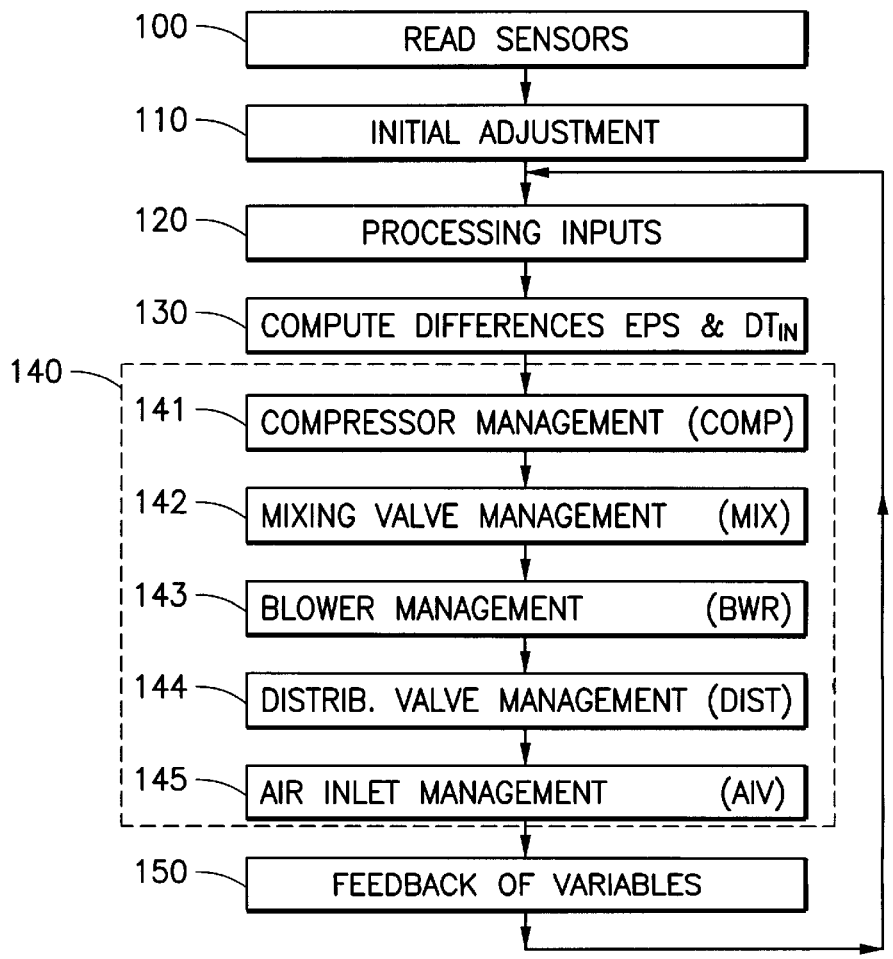
FIG. 2 is a process chart showing the main steps in the method of regulation of the installation shown in FIG. 1.

Reference is now made more particularly to FIG. 2, to describe the main steps in the process of defining the adjustments for the various components of the installation shown in FIG. 1.

In a first step 100, the signals from the four sensors 23 to 26 are read. These signals represent, respectively, the prevailing inside temperature $T_{in}$, the prevailing outside temperature $T_{out}$, the prevailing evaporator temperature $T_{eva}$, and the prevailing water temperature $T_{wtr}$.

In the next step 110, initial adjustments are carried out on the five valves, namely the mixing valve 6, the distribution valves 7 to 9, and the air inlet valve 17. This initial adjustment is carried out using fuzzy logic, as a function of the outside temperature $T_{out}$. The initial adjustment also concerns the initial adjustments of the motor of the blower 14, and that of the compressor 3. Further reference will be made to this initial adjustment step 110 later in this description.

The next step is an input processing step 120, in which the inputs are processed by memorising, in a first memory 27 of the control module 22 (after any optional electronic treatment of the input signals consisting of filtering and/or correction), the prevailing outside temperature $T_{out}$, the prevailing inside temperature $T_{in}$, the evaporator temperature $T_{eva}$, the prevailing water temperature $T_{wtr}$, and the demand temperature $T_{set}$ as set by the user.

When the user decides to use a manual operating mode and not an automatic mode for the installation, it is also possible to memorise other parameters set by the user, for example the speed of the blower, the location in the cabin to which the treated air is to be distributed, and so on.

The next step is a computing step 130, in which two temperature differences are calculated. The first of these temperature differences, EPS, is the difference between the temperature setting $T_{set}$ and the prevailing inside temperature $T_{in}$ that exists at the instant at which the temperatures are measured. The second temperature difference, $DT_{in}(t)$, represents the difference between the inside temperature $T_{in}(t-1)$ which is obtained during the last previous measurement operation and memorised in the first memory 27, and the prevailing inside temperature $T_{in}(t)$ which has just been measured by the sensor 23.

The control module 22 is able to deduce from these two temperature differences a certain number of items of information relating to the adjustments of the various components of the installation. Thus, if, at an instant t, the first difference EPS(t) is less than zero, that is to say the temperature setting $T_{set}(t)$ is less than the prevailing internal temperature $T_{in}(t)$, then it is necessary to cool the cabin H. On the other hand, if the first difference EPS(t) is greater than zero, it is then necessary to heat the cabin H.

In addition, if the second difference in internal temperature, $DT_{in}(t)$, between two successive instants (t-1) and t, is less than zero, then the inside temperature value $T_{in}(t-1)$ at instant (t-1) was less than the value $T_{in}(t)$ prevailing at instant t, and consequently the temperature is rising inside the cabin. On the other hand, if the second difference $DT_{in}(t)$ is greater than zero, then the temperature is falling inside the cabin.

Using these two temperature differences, and measurements of prevailing temperatures obtained from the various sensors, the control module 22 is capable, in a management step 140, of defining or optimising the respective adjustments for the various components of the installation. Among these are, in particular, adjustments COMP for the compressor (step 141); adjustments MIX for the mixing valve 6 (step 142); adjustments BWR for the blower 14 (step 143); adjustments DIST for the various distribution valves 7 to 9 (step 144); and adjustments AIV for the air inlet valve 17 (step 145).

The management of all of these components of the installation can, in accordance with the invention, be effected using fuzzy logic, as will be seen in greater detail later in this description.

In a final step 150, each of the variables corresponding to the various components of the installation is fed back so as to replace, for example in the first memory 27, the respective values that were prevailing immediately after the initial adjustment step 110. Thus this feedback is taken to the point in the process just before the processing step 120, whereupon the control module repeats all of the steps 120, 130, 140 and 150, so as to optimize the adjustments defined during the preceding cycle.

Reference is now made more particularly to FIGS. 3 to 5, in order to describe in detail the initial adjustment procedure for the various components of the installation, carried out in step 110 in FIG. 2.

FIG. 3A shows one example of a fuzzy distribution of the outside temperature $T_{out}$ for temperatures in the ranges between $-10°$ C. and $+40°$ C. This diagram defines five temperature ranges, which are referred to, respectively, as Very Cold Weather, Cold Weather, Temperate Weather, Hot Weather and Very Hot Weather. One zone in this weighting diagram is associated with each of these temperature ranges.

By way of example, if the outside temperature $T_{out}$ is about 8° C., then this value of temperature lies firstly in the temperature range referred to as Cold Weather, which it intersects at a level substantially equal to 0.3 on the ordinate axis, and secondly, the temperature range referred to as Temperate Weather, which it intersects at a level substantially equal to 0.7%. The level concerned fixes the "weight" of the outside temperature with respect to the range under consideration. Thus, in the example corresponding to 8° C., the outside temperature is considered by the control module 22 as being more temperate than cold, because the relative "weights" of the Temperate Weather and Cold Weather lines at 8° C. are 0.7 and 0.3 respectively.

This fuzzy distribution, like those in the remainder of this description and the tables of fuzzy rules which will be explained later herein, includes elements for which a complete description in the text would be unnecessarily lengthy. Consequently, the principles of weighting diagrams and fuzzy rule tables, as explained here with reference to FIGS. 3A to 3C, will not be repeated for the other Figures.

FIG. 3B shows, again in the form of a weighting diagram, the fuzzy distribution of the parameter MIX, which is the degree to which hot and cold air are mixed, represented by the percentage of opening of the mixing valve 6. This fuzzy distribution is obtained from the same five ranges of outside temperature defined above. It enables five positions of the mixing valve 6 to be defined, that are associated respectively with the five ranges of outside temperature. In this example, these five positions of the mixing valve are as follows: 0% opening; 35% opening; 50% opening; 70% opening; and 80% opening.

In this connection, 0% opening means that the heating radiator 5 is obturated so that, in FIG. 1, all of the air from the evaporator 2 is passed towards the distribution valves 7 to 9 without being heated.

Thus the higher the value of the parameter MIX, the greater is the proportion of heated air in the mixture. In this connection, in FIG. 3B, the five temperature ranges are reversed as compared with FIG. 3A, so that for example the Very Hot Weather range is represented by the line going from 1% on the ordinate to 45% on the abscissa.

It is therefore possible to establish a first table of fuzzy rules such as that given in FIG. 3C, which establishes correspondence between the five ranges of outside temperature and the five positions, given above by way of example, of the mixing valve 6. This table is memorised, for example digitally, in a second memory 29 (FIG. 1) of the control module 22. Thus, if the prevailing outside temperature $T_{out}$ falls for example within the Cold Weather range, there is associated with it an initial position MIX of the mixing valve 6 denoted as "70% open", which corresponds to the valve 6 being open by 70% of its full aperture. The initial adjustment module 30 (FIG. 1), which can be incorporated into the control module 20, then puts the mixing valve 6 into the position in which it is 70% open.

The module 30 then proceeds to define the initial adjustment of the air inlet valve 17. For this purpose, the initial adjustment module 30 makes reference to a second table of fuzzy rules, shown for this example in FIG. 4, which is again memorised in the second memory 29. This second table establishes correspondence between the outside temperature ranges defined in FIG. 3A and the associated positions AIV of the air inlet valve 17.

As is most usually the case in air conditioning installations, the air inlet valve 17 is only able to assume two positions, namely a "recycled air" position in which the recycled air inlet duct 15 (FIG. 1) is open, and a "fresh air" position, in which the outlet of the second inlet duct 16 in FIG. 1 is open while the outlet of the first duct 15 is closed. Thus, following the table in FIG. 4, if the outside temperature $T_{out}$ lies within the Very Cold Weather temperature range or the Very Hot Weather temperature range, the air inlet valve 17 is accordingly put into its "recycled air" position, while if the outside temperature lies in one of the ranges here called Cold Weather, Temperate Weather or Hot Weather, the air inlet valve must be put into its "fresh air" position.

The initial adjustment module 30 then passes to the task of defining the initial adjustment of the various distribution valves 7 to 9. This definition is carried out as a function of the initial position MIX of the mixing valve 6 and the value of the outside temperature $T_{out}$, and depends on the fuzzy distributions of the position MIX of the mixing valve and of the outside temperature. In this connection, FIG. 5A shows the fuzzy distribution of the position MIX of the mixing valve which enables three temperature ranges to be defined. These ranges are here referred to as Cold, Moderate, and Hot, the percentages of opening of the mixing valve 6 being associated with these ranges. The fuzzy distribution of the outside temperature $T_{out}$ is identical to that shown in FIG. 3A in this case.

From these two fuzzy distributions in FIGS. 3A and 5A, a third fuzzy distribution, illustrated in FIG. 5B, can then be defined. The diagram in FIG. 5B defines five zones which correspond respectively to particular positions of the distribution valves 7 to 9, given again as percentages of opening of the respective valves. These five positions are here denoted, respectively, as "Open OA", "Open 30PDA", "Open 50PDA", "Open 65PD", and "Open 10OP". In this notation, the capital letters A, P and D designate the ventilation distribution valve 8, the foot level distribution valve 9, and the de-icing distribution valve 7 respectively. The numeral preceding the capital letter or letters indicates the percentage of opening of the corresponding distribution valve.

From these fuzzy distributions, i.e. those given in FIGS. 3A, 5A and 5B, a third table of fuzzy rules can be defined, to establish correspondence between pairs of parameters and the various positions of the distribution valves quoted above. Each pair of parameters consists of a range of the outside temperature $T_{out}$ (first column in FIG. 5C) and one of the ranges of the parameter MIX, i.e. Cold, Moderate and Hot. This table, in FIG. 5C, is memorised in the second memory 29.

Thus, if the outside temperature $T_{out}$ is in the Cold Weather range, and if in addition the position of the mixing valve lies in the "Moderate" temperature range, then the initial adjustment module 30 puts the foot level distribution valve 9 and the de-icing distribution valve 7 into the positions in which they are both open by 65%, while the ventilating distribution valve 8 is closed.

The initial adjustment step 110 (FIG. 2) is continued by defining the initial adjustments for the blower 14 and compressor 3. The electric motor that controls the running mode of the blower has a voltage which is variable between 0 and 12 volts. Preferably, initial adjustment of the blower consists in fixing the motor voltage at 3 volts. In addition, in this example, the compressor 3, being of fixed capacity, is put out of commission, which puts the cold loop of the installation out of commission.

The initial adjustment step 110 is now complete. The installation then operates for several moments on the basis of its initial adjustments, and then passes to the optimisation phase or management step 140. The step 140 is preferably managed by a regulating module 31, FIG. 1, which may itself include the initial adjustment module 30.

The optimisation phase 140 starts with the step 141, during which the adjustment COMP for the compressor 3 is defined, this having previously been put out of commission by the initial adjustment module 30. Where the compressor is of fixed capacity as in this example, the defining of its adjustment does not call for the use of fuzzy logic.

In practice, in this step 141, the regulating module 31 verifies, before any adjustment COMP for the compressor 3 is defined, whether there is any risk of ice forming from the water which has condensed on the surface of the evaporator 2. The regulating module 31 then searches in the first memory 27 for the measurement of the prevailing temperature $T_{eva}$ of the evaporator, and then it compares this temperature with temperature threshold values, namely a low threshold value $TS1_{eva}$ and an upper threshold $TS2_{eva}$.

More precisely, the regulating module 31 compares the prevailing evaporator temperature $T_{eva}$ with a function which is memorised (preferably in the second memory 29), and which is indicated in FIG. 6, to which reference is now made. This function is of a hysteresis type. It defines ranges during which automatic operation of the air conditioning mode (AC) of the installation is either authorised or inhibited. Authorisation to operate air conditioning is accordingly carried out as follows. The regulating module 31 searches in the first memory 27 for the last preceding measurement of evaporator temperature, $T_{eva}(t-1)$, and the new measurement of evaporator temperature $T_{eva}(t)$. If the new temperature is lower than the preceding one, that part of the function shown in FIG. 6 which includes arrows pointing towards the left is employed. On the other hand, if the new evaporator temperature is higher than the previous temperature, then it is the function in FIG. 6 in which the arrows go towards the right that is employed.

When the comparison of the temperature of the evaporator with the two threshold values $TS1_{eva}$ and $TS2_{eva}$ permits starting of the air conditioning operation, then, and preferably before any effective starting has taken place, a new comparison is made in order to determine whether it is truly of use to start the compressor 3.

To this end, the regulating module 30 searches in the first memory 27 for the prevailing measurement of water temperature $T_{wtr}$ received from the fourth sensor 26, and makes use of the prevailing value of the first difference EPS. A comparison is first carried out between the prevailing water temperature $T_{wtr}$ and a threshold such as 60° C. If $T_{wtr}$ is larger than the threshold, the compressor 3 is then started. On the other hand, if the water temperature $T_{wtr}$ is below the threshold value, a further comparison is carried out, between the prevailing value of the first difference EPS and another threshold value which is less than or equal to zero. If EPS is below this further threshold, this signifies that it is necessary to cool the cabin, that is to say there is a demand for cooling by the user. The regulating module 31 then puts the compressor 3 in its operating state. However, if EPS is higher than the above mentioned further threshold value, this signifies that cooling of the cabin is inappropriate, so that the regulating module 31 accordingly leaves the compressor in its inoperative state. In addition, when the air conditioning function has not been authorised, the compressor 3 is systematically put out of operation, and this secures the cold loop of the installation.

After the adjustment COMP for the compressor 3 has been defined, the system passes to the step 142 in FIG. 2, so as to define the optimised adjustment MIX of the mixing valve 6. The initial setting of the mixing valve which was defined during the initial adjustment step 110 may no longer be valid after a few moments, because of the convergence of the inside temperature $T_{in}$ towards the temperature setting $T_{set}$. In practice, to the extent that the inside temperature does converge in this way, the installation concerns itself more with the changes which it has to apply to the position of the mixing valve than with the redefinition of this position on each cycle. The change of the position of the mixing valve 6 is denoted DMIX. This variation is measured in terms of the percentage of full aperture by which the mixing valve is open, and is determined as a function of the prevailing first difference EPS and second difference $DT_{in}$. Here once again, fuzzy rules are employed.

In this connection, reference is made to FIGS. 7A to 7D. FIG. 7A shows the fuzzy distribution of the first difference EPS over a range which varies between −15' C. and +15° C. This first diagram enables five ranges to be defined, which are referred to, respectively, as the Very Negative range TN, the Negative range N, the Zero range Z, the Positive range P, and the Very Positive range TP. One change in the position of the mixing valve 6 is associated with each of these ranges. More precisely, these changes in mixing valve position can here be given names, as follows in quotation marks:

"No change", associated with the Z range;

"Slightly close mixing valve", associated with the N range;

"Close mixing valve by more", associated with the TN range;

"Slightly open mixing valve", associated with the P range; and

"Open mixing valve by more", associated with the TP range.

Each of the ranges TN, N, Z, P and TP corresponds to a respective one of the determined values of the prevailing first difference EPS.

FIG. 7B shows the fuzzy distribution of the second difference $DT_{in}$ for variations in temperature between −1° C. and +1° C. Again, this diagram enables five ranges to be defined, these being called, in this example, "$T_p$ rising greatly", "$T_p$ rising", "$T_p$ stable", "$T_p$ falling", and "$T_p$ falling greatly". Thus, each of the above mentioned five ranges corresponds to a respective one of the determined values of the second difference $DT_{in}$.

Similarly, a fuzzy distribution is defined for the change in the position of the mixing valve, DMIX, as shown in FIG. 7C. Accordingly, this diagram shows the variation in position between values of DMIX from −3.5% and +3.5% of opening. This fuzzy distribution defines seven ranges which include the five ranges TN, N, Z, P and TP defined above, and two further ranges, namely a Very Very Negative range TTN, and a Very Very Positive range TTP, with which are associated the variations in position of the mixing valve 6 identified in quotation marks as follows:

"Close mixing valve even more", associated with the TTN range; and

"Open mixing valve even more", associated with the TTP range.

Thus each of the above mentioned seven ranges corresponds to a percentage variation in the position of the mixing valve 6, and in consequence an operation to be performed, consisting of increasing the degree of opening, reducing the degree of opening, or preserving the current setting.

FIG. 7D shows a fourth table of fuzzy rules which can be derived from the various fuzzy distributions described above with reference to FIGS. 7A to 7C. The rules in this table establish correspondence between pairs, consisting of a range of the first difference EPS and a range of the second difference $DT_{in}$, on the one hand, and the variations DMIX in the position of the mixing valve, expressed as a percentage. This fourth table is again stored in the second memory 29.

In order to determine the new adjustment (or optimised adjustment) of the mixing valve 6, the regulating module 31 then compares the prevailing values of the first difference EPS and the second difference $DT_{in}$ with the fourth table (FIG. 7D) stored in the second memory 29. Accordingly, if the first difference EPS lies in the N range, and the second difference $DT_{in}$ is in the "$T_p$ stable" range, this means that the mixing valve 6 must be closed by a small amount.

Once the operation of defining the position of the mixing valve 6 has been terminated, the regulating unit 31 passes to the step 143 (FIG. 2), in which adjustments of the blower 14 are determined. In practice, as explained above, adjustment of the blower consists in controlling the power supply voltage to its electric motor, which lies in the range substantially between 0 and 12 volts. This definition is performed as a function of the prevailing first difference EPS and the water temperature $T_{wtr}$. Here again, fuzzy distributions are used.

In this connection, reference is now made to FIGS. 8A to 8C. The fuzzy distribution of the first difference EPS is in fact identical to that shown in FIG. 7A described above in respect of step 142. The fuzzy distribution of the water temperature $T_{wtr}$, in degrees Celsius, is shown in FIG. 8A for values of water temperature between +10° C. and +90° C. This diagram defines three ranges of temperature referred to as COLD, MODERATE and HOT. Thus, to each value of the measured water temperature $T_{wtr}$ there corresponds one of these three ranges.

FIG. 8B shows the fuzzy distribution of the blower supply voltage BWR, represented in volts for values between 0 and 8 volts. The diagram shown in FIG. 8B enables three blower voltage ranges to be defined, which are referred to as the MINI range, the MIDDLE range, and the HIGH range. Thus, a voltage range is associated with each value BWR of the supply voltage to the blower 14.

FIG. 8C shows a fifth table of fuzzy rules derived from these three fuzzy distributions. This table establishes correspondence between pairs consisting of, on the one hand, a range of the first difference EPS and a range of water temperature $T_{wtr}$, and on the other hand the adjustments of the blower represented by the three voltage ranges MINI, MIDDLE and HIGH. Once again, this table is memorised in the second memory 29. Thus, for example if the first difference EPS falls within the N (negative) range, and if the water temperature $T_{wtr}$ falls within the HOT range, then the supply voltage to the motor of the blower 14 is in the MIDDLE range.

Consequently, in order to define the supply voltage BWR for the blower, the regulating module carries out a comparison between the prevailing value of the first difference EPS and the prevailing value of the water temperature $T_{wtr}$, and the fifth table of fluid rules. From this it deduces the corresponding correct voltage BWR and applies this to the motor of the blower 14.

An optional complementary processing operation may be provided in the step 143. This optional step consists in verifying whether the new prevailing value BWR (t) that has just been defined is substantially different from the last preceding value BWR(t-1). This additional processing operation can prevent the occurrence of excessively sharp variations in the mass flow of air delivered by the blower 14. Such sharp variations can in particular have an unpleasant acoustic effect which is uncomfortable for the occupants of the vehicle.

The regulating module 31 preferably performs a comparison between BWR(t-1) and BWR(t). If the difference between these two values is large, that is to say if it exceeds a predetermined threshold value, the regulating module 31 will then take the mean of these two values, and impose this mean value on the blower 14 by way of adjustment of the latter.

The system then passes to step 144 (FIG. 2), in which the positions of the various distribution valves 7 to 9 are optimised. The definition (or optimisation) of the positions of the distribution valves is performed as a function of the prevailing outside temperature $T_{out}$ and the position of the mixing valve MIX which was determined in step 142. It is governed by the same fuzzy rules as those which are described above in connection with the initial adjustment step 110 and with reference to FIGS. 3A to 3C.

There is preferably also provided a dead zone of opening, which is such that the positioning mechanisms for each of the distribution valves (which in practice consist of electric motors) will not be unnecessarily operated when the variations in valve positions are of very small amplitude.

The value of the position of the mixing valve that is taken into account in order to define the positions (DIST) of the distribution valves is the value of the variable MIX at the instant (t-1) added to the value of the change in position of the mixing valve, DMIX(t), that was calculated in step 142.

It only then remains to define the position AIV of the air inlet valve 17, which is done in step 145 (FIG. 2). In this step, the air inlet valve is positioned as a function of the prevailing values of the first difference EPS(t) and the outside temperature $T_{out}(t)$. The air inlet valve 17 is controlled using fuzzy rules derived from (a) the fuzzy rules for the first difference EPS, (b) the outside temperature $T_{out}$, as explained above with reference to FIGS. 7A and 3A respectively, and (c) the position AIV of the air inlet valve (FIG. 4).

The fuzzy rules drawn from these three fuzzy distributions are given in FIG. 9, to which reference is now made. FIG. 9 consists of a sixth table of fuzzy rules which establish correspondence between, on the one hand, pairs consisting of a range of the first difference EPS and a range of outside temperature $T_{out}$, and, on the other hand, the two possible positions of the air inlet valve 17, namely its recycled air and fresh air positions. This sixth table is again memorised in the second memory 29.

In order to fix the position AIV of the air inlet valve 17, the regulating module 31 then only needs to make a comparison between the pair consisting of the prevailing values of the outside temperature $T_{out}$ and the first difference EPS on the one hand, and the table of FIG. 9, as memorised in the second memory 29, on the other. The required setting of the air inlet valve is deduced from this comparison. Thus, for example, if the prevailing outside temperature falls in the Hot Weather range, and the first difference EPS is in the P range, then the corresponding required setting AIV of the air inlet valve 17 is Fresh Air. In consequence, the air that has to be supplied to the blower 14 must be drawn from outside the cabin of the vehicle, for which purpose the first duct 15 in FIG. 1 will be closed.

The definition of the various adjustments for the adjustable components of the installation is now complete, and the system passes to the feedback step 150 in FIG. 2, in which the process returns to step 120 in order to begin, once again, redefining or optimising the different variables.

In order to permit rapid adaptation of the installation following a modification $DT_{set}$ in the demand temperature $T_{set}$ initially made by the user, a seventh table of fuzzy rules is provided. This table is shown in FIG. 10C and relates to the mixing valve 6. This seventh table is memorised in the second memory 29.

In this connection reference is also made to FIGS. 10A and 10B. In practice, in order to satisfy as fast as possible the user's demands, the regulating module 31 adds to the change DMIX in the position of the mixing valve, calculated during step 142, a second change D2MIX which depends directly on the change $DT_{set}$ in the temperature setting made by the user. This change $DT_{set}$ is calculated with the aid of fuzzy rules which are derived from the fuzzy distribution of the change $DT_{set}$ in the demand temperature, and from the associated variation DMIX in the position of the mixing valve.

The fuzzy distribution of the variation $DT_{set}$ in the temperature setting made by the user is given in the diagram of FIG. 10A, for variations in temperature between −10° C. and +10° C. This fuzzy distribution enables three ranges to be defined, which are referred to as NEGATIVE, ZERO and POSITIVE, respectively. The possible changes $DT_{set}$ in the temperature setting are associated with these three ranges. Thus, the prevailing value of the change in the demand temperature being known, it is possible to determine which of the above mentioned ranges is applicable to it.

The fuzzy distribution of the change D2MIX in the position of the mixing valve is given in the diagram of FIG. 10B, for values of changes between −10% and +10% in the degree of opening of the mixing valve. This diagram enables three ranges to be defined which are referred to here as "Close Valve", "Don't Move", and "Open Valve", respectively. The table in FIG. 10C is derived from the distributions shown in FIGS. 10A and 10B, and establishes correspondence between the ranges of variation $DT_{set}$ in the temperature demanded by the user and the associated changes D2MIX in the position of the mixing valve.

Thus, in the event that the user changes his demand, i.e. alters the temperature setting control using the appropriate button 20, 21 (FIG. 1), the regulating module 31 makes a comparison between this change in the temperature demand, $DT_{set}$, and the table of FIG. 10C as memorised in the second memory 29. The regulating module then deduces from this the required change to be made in the position of the mixing valve, D2MIX.

The invention is not limited to the embodiment described above with reference to the drawings, but embraces all modified versions which could be developed by a person skilled in the art within the scope of the claims of this Application. Thus for example, the invention not only relates to air conditioning installations, but to any installation for the purpose of heating, ventilating, and/or air conditioning. In consequence, if the installation is only a heating and ventilating system, there is then no need to address the question of adjustment of the compressor, nor that of the air inlet valve.

Moreover, the installation described above is one in which the compressor is of fixed capacity, but it will be clearly understood that the fuzzy rules can be defined for compressors of variable capacity.

Again, the invention is applicable to installations more sophisticated than that described above, for example those in which regulation can be made for various different zones in the cabin, i.e. at least two such zones. In such a situation it will then be necessary to manage two mixing valves separately, one mixing valve for each zone, and, possibly, two blowers and/or two groups of air distribution valves.

What is claimed is:

1. Heating and ventilating apparatus for the cabin of a motor vehicle having a liquid-cooled engine with a coolant fluid circuit, the apparatus comprising:

an air treatment and distribution unit having a casing, adjustable distribution valves in the casing for controlling distribution, into the cabin of air treated by the apparatus, a heater in the casing, an adjustable mixing valve in the casing associated with the heater for controlling flow of air through the heater, the casing including adjustable air inlet means comprising fresh air inlet means for receiving air from outside the vehicle and recycled air inlet means for receiving air from the cabin, the mixing valve, heater and distribution valves being downstream of the said inlet means;

a blower associated with the said unit, for drawing air through the inlet means for treatment of said air in the said unit;

a first sensor for periodically measuring an inside temperature, being the air temperature in the cabin;

a second sensor for periodically measuring an outside temperature, being a temperature outside the cabin;

a setting module arranged to be accessible by an occupant of the cabin for setting demand values of atmospheric parameters, said parameters including at least a demand temperature for the cabin; and control means connected with said blower, first and second sensors, and setting module, the control means being adapted for measuring a first value difference, being the difference between the demand temperature and the prevailing said inside temperature, the control means comprising:

a first memory for storing the prevailing values of the said inside and outside temperatures received from said first and second sensors respectively, and the demand temperature received from the setting module; and a regulating module for defining required adjustments of at least the adjustable components of the apparatus included in the said air treatment and distribution unit, and required adjustments for the blower, by derivation of the said required adjustments from the said first value difference and from the prevailing outside temperature, wherein the apparatus further includes a third sensor associated with the coolant fluid circuit for measuring a water temperature, being the temperature of the coolant liquid of the engine, the said control means including a second memory adapted to store:

a first table of fuzzy rules establishing correspondence between ranges of said outside temperature and positions of the mixing valve;

a second table of fuzzy rules establishing correspondence between pairs of values consisting of ranges of said outside temperature and ranges of mixing valve position, on the one hand, and required positions of the distribution valves on the other; and a third table of fuzzy rules establishing correspondence between pairs of values consisting of ranges of said water temperature and said first difference, on the one hand, and required adjustments for the blower on the other, and wherein the regulating module is adapted at least:

to compare the said first table with the prevailing outside temperature and to derive therefrom a definition of a required position for the mixing valve;

to compare the said second table with the pair of values consisting of the prevailing said outside temperature and the mixing valve position just defined, and to define the required positions of the distribution valves by derivation from the resulting comparison; and to compare the said third table with the prevailing water temperature, and to define the required adjustment for the blower by derivation from the resulting comparison.

2. Apparatus according to claim 1, wherein the control means are adapted to measure a second value difference, between a memorised historical first value of the said inside temperature and a prevailing second value of the said inside temperature, the said first and second values being measured in succession, the regulating module being further adapted to compare the said fourth table with the pair of values consisting of prevailing values of the said first and second differences, and to determine a required change in the position of the mixing valve by derivation from the resulting comparison, whereby to optimise the position of the mixing valve.

3. Apparatus according to claim 2, wherein the regulating module is further adapted to compare the said second table with the optimised position of the mixing valve, and to optimise the positions of the distribution valves from the result of this comparison.

4. Apparatus according to claim 1, further including an air inlet valve associated with the said air inlet means for selectively opening and closing the said fresh air inlet means and recycled air inlet means, the air inlet valve being disposed upstream of the blower, the said second memory being further adapted to store a fifth table of fuzzy rules establishing correspondence between pairs of values consisting of ranges of the said first difference and ranges of the said outside temperature, on the one hand, and positions of the air inlet valve on the other hand, the regulating module being further adapted to compare the said fifth table with a pair of values consisting of the prevailing values of the said first difference and the said outside temperature, and to define a required position of the air inlet valve by derivation from the result of this comparison.

5. Apparatus according to claim 1, wherein the said air treatment and distribution unit further includes an evaporator, the apparatus further comprising a refrigeration circuit including a compressor and means connecting the compressor with the evaporator for supplying a refrigerant fluid to the evaporator, the apparatus including a fourth sensor for measuring the temperature of the evaporator, the control means including means for defining a first threshold value and a second threshold value of the said evaporator temperature, the regulating module being further adapted to compare the prevailing value of the evaporator temperature, measured by the said fourth sensor, with the said first and second threshold values, and, according to the result of this comparison, to decide whether the compressor is to be started.

6. Apparatus according to claim 5, wherein the said second memory is further adapted to store a sixth table of fuzzy rules establishing correspondence between pairs of values consisting of ranges of the said first difference and ranges of said water temperature, on the one hand, and required adjustments of the compressor on the other hand, the regulating module being further adapted to compare the said sixth table with a pair of values consisting of the prevailing value of the said first difference and the prevailing value of the water temperature, and, after deciding whether the compressor is to be started, to define a required adjustment for the compressor as a result of this comparison.

7. Apparatus according to claim 1, wherein the regulating module includes an initial adjustment module for defining, in response to at least the prevailing value of the said outside temperature, initial values of adjustment for adjustable components of the apparatus each time the apparatus is started.

8. Apparatus according to claim 7, wherein the initial adjustment module is adapted to compare the said first table with the prevailing value of the said outside temperature and to define therefrom an initial position of the mixing valve, to make a further comparison between the said second table and a pair of values consisting of the prevailing value of the said outside temperature and the said initial position of the mixing valve just defined, and to define initial positions of the distribution valves as a result of the said further comparison, the initial adjustment module being further adapted to fix an initial adjustment of the blower at a predetermined threshold value.

9. Apparatus according to claim 4, wherein the regulating module includes an initial adjustment module for defining, in response to at least the prevailing value of the said outside temperature, initial values of adjustment for adjustable components of the apparatus each time the apparatus is started, and wherein the said second memory is further adapted to store a seventh table of fuzzy rules establishing correspondence between ranges of said outside temperature and ranges of positions of the air inlet valve, the initial adjustment module being adapted to compare the said seventh table with the prevailing value of said outside temperature, and to define, as a result of this comparison, an initial position of the air inlet valve.

10. Apparatus according to claim 5, wherein the regulating module includes an initial adjustment module for defining, in response to at least the prevailing value of the said outside temperature, initial values of adjustment for adjustable components of the apparatus each time the apparatus is started, and wherein the initial adjustment module is further adapted to fix an initial adjustment of the compressor at a predetermined threshold value.

11. Apparatus according to claim 2, wherein the said second memory is further adapted to store an eighth table of fuzzy rules establishing correspondence between the change in demand temperature between a value of said demand temperature and a subsequently modified value of the demand temperature, on the one hand, and required modified positions of the mixing valve on the other hand, the regulating module being further adapted so as, in the event of the value of the demand temperature being changed by a user from the said first value to the said modified value thereof, to compare the said eighth table with the said change in demand temperature, and to determine as a result of this comparison a required change in the position of the mixing valve, whereby to modify the position of the mixing valve.

12. Apparatus according to claim 11, wherein the regulating module is further adapted so as, in the event of optimisation of the position of the mixing valve followed by determination of a change in the required position of the mixing valve as a result of a said change in the demand temperature, to compare a threshold value with the sum of the modified position of the mixing valve and the change in mixing valve position, and to decide, as a result of this comparison, whether to modify the memorised position of the mixing valve.

13. Apparatus according to claim 11, wherein the regulating module is further adapted so as, in the event of optimisation of the position of the mixing valve followed by determination of a change in the required position of the mixing valve as a result of a said change in the demand temperature, to compare the demand temperature with a first threshold and a second threshold and to decide, as a result of this comparison, whether to open or close the mixing valve without having regard to the determined change in the position of the mixing valve.

14. Apparatus according to claim 1, wherein the regulating module is further adapted to perform, prior to establishment of any new value for adjustment of the blower, a comparison between the said new value for adjustment of the blower and the memorised preceding adjustment of the blower, and then, as a result of this comparison, to establish an adjustment for the blower having a value selected from the said new value and a mean value between the said new value and the said preceding value.

* * * * *